United States Patent
Brings et al.

(10) Patent No.: US 7,422,691 B2
(45) Date of Patent: Sep. 9, 2008

(54) METHOD AND APPARATUS FOR THE DEMINERALIZATION OF WATER

(75) Inventors: Burkhard Brings, Köln (DE); Wolfgang Podszun, München (DE)

(73) Assignee: LANXESS Deutschland GmbH, Leverkusen (DE)

( * ) Notice: Subject to any disclaimer, the term of this patent is extended or adjusted under 35 U.S.C. 154(b) by 0 days.

(21) Appl. No.: 11/709,484

(22) Filed: Feb. 22, 2007

(65) Prior Publication Data

US 2007/0215550 A1 Sep. 20, 2007

(30) Foreign Application Priority Data

Feb. 28, 2006 (DE) .................. 10 2006 009 522

(51) Int. Cl.
B01D 15/00 (2006.01)
(52) U.S. Cl. .................. 210/661; 210/687; 210/263
(58) Field of Classification Search .......... 210/661, 210/687, 263
See application file for complete search history.

(56) References Cited

U.S. PATENT DOCUMENTS

| | | | |
|---|---|---|---|
| 3,458,436 A | 7/1969 | Martinola et al. | 210/20 |
| 4,419,245 A | 12/1983 | Barrett et al. | 210/681 |
| 4,427,794 A | 1/1984 | Lange et al. | 521/28 |
| 4,444,961 A | 4/1984 | Timm | 526/88 |
| 4,461,706 A | 7/1984 | Siegers | 210/275 |
| 5,231,115 A | 7/1993 | Harris | 521/28 |
| 5,658,459 A * | 8/1997 | Guttormsen | 210/279 |
| 6,667,349 B1 | 12/2003 | Lutjens et al. | 521/32 |
| 7,053,129 B1 | 5/2006 | Klipper et al. | 521/32 |
| 2002/0195392 A1 | 12/2002 | Schmid et al. | 210/681 |

FOREIGN PATENT DOCUMENTS

| | | |
|---|---|---|
| EP | 1 000 660 | 3/2005 |
| GB | 1 321 058 | 6/1963 |
| WO | 96/17805 | 6/1996 |

OTHER PUBLICATIONS

Seidl, Malinsky, Dusek, Heitz, Adv. Polymer Sci., vol. 5, pp. 113-213, (1967) "Makroporose-Divinylbenzol-Copolymere und ihre Verwendung in der Chromatographie und zur Darstellung von Ionenaustauschern".

* cited by examiner

Primary Examiner—Chester T. Barry
(74) Attorney, Agent, or Firm—Nicanor A. Kohncke

(57) ABSTRACT

The present invention relates to a method for the demineralization of water using a combination of a monodisperse cation filter operated as a lift bed and a monodisperse anion filter operated in the cocurrent flow procedure, and also devices which comprise such a lift bed in combination with at least one cocurrent flow filter and if appropriate a trickling degasser and/or a mixed-bed filter.

8 Claims, 1 Drawing Sheet

METHOD AND APPARATUS FOR THE DEMINERALIZATION OF WATER

Figure 1:
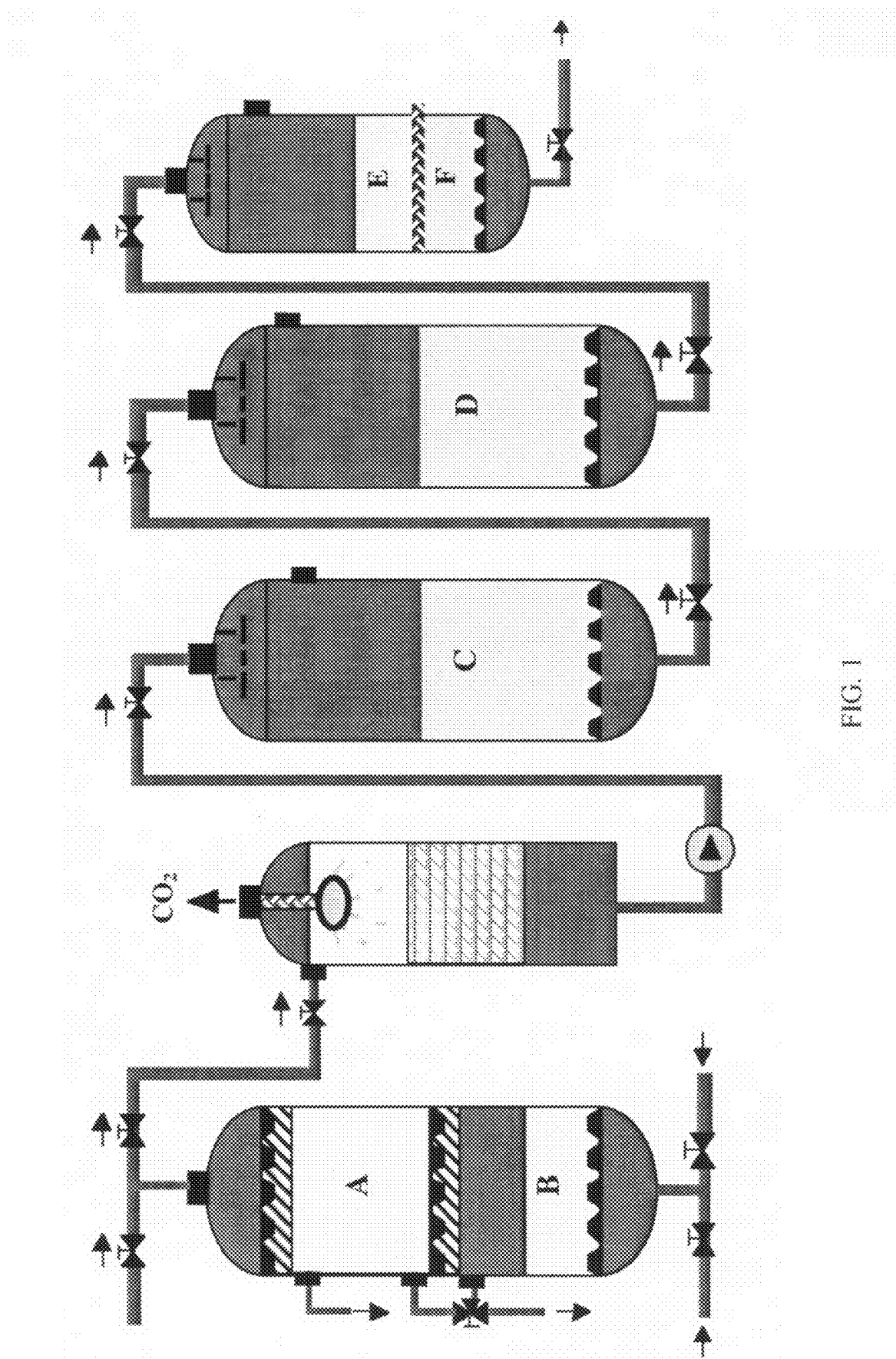

The present invention relates to a method for the demineralization of water using a combination of a monodisperse cation filter operated as a lift bed and a monodisperse anion filter operated in the cocurrent flow procedure, and also devices which comprise such a lift bed in combination with at least one cocurrent flow filter and if appropriate a trickling degasser and/or a mixed-bed filter.

BACKGROUND OF THE INVENTION

What is termed the lift bed method for treating liquids is disclosed, for example, by DE 2950875 A1 (=U.S. Pat. No. 4,461,706). This relates to a countercurrent flow method for treating liquids with adsorption media by loading the adsorption media in upward flow, the lower part of the adsorption medium mass being present as fluidized bed and the upper part as fixed bed, regenerating the loaded adsorption media in downward flow and backwashing in upward flow by subdividing the filter space into at least two chambers separated by liquid-permeable bases, connecting these chambers to one another via pipes which bridge the liquid-permeable bases, permit the transport of adsorption medium and are provided with a shutoff element, distributing the adsorption medium among the chambers and before and/or during the individual working phases setting defined filling levels in the individual chambers by transferring adsorption medium from one chamber via the pipes bridging the liquid-permeable bases to the other chamber by means of liquid to be treated, regeneration medium or backwash liquid.

In many cases it is expedient, in addition to the ion-exchanger resins, to use an inert material. In this manner, the risk of blocking nozzle slots is substantially excluded.

The advantages of the lift bed method according to DE 2 950 875 A1 (=U.S. Pat. No. 4,461,706) over conventional methods were higher regeneration efficiency in association with reduction of the chemical requirement, reduction of the waste water amount, internal backwashing, and also flexibility, versus the introduction of impurities in the form of suspended substances and also simultaneous insensitivity to load variations. However, such lift bed methods require a greater capital expenditure and in addition require increased closed-loop and open-loop control expenditure.

It was an object of the present invention to optimize the proven method according to DE 2 950 875 A1 (=U.S. Pat. No. 4,461,706) with respect to said disadvantages. It was found that highly efficient demineralization plants are obtained when the cation filter is operated in the lift bed mode and the anion filter or filters are operated in cocurrent flow mode and, in addition, the ion-exchanger resins used have a monodisperse particle size distribution.

DETAILED DESCRIPTION OF THE INVENTION

The present invention thus relates to a method for the demineralization of water using ion-exchanger filters, which comprises using a combination of a cation filter comprising monodisperse strongly acidic cation exchangers and operated as a multichamber lift bed and also at least one anion filter comprising monodisperse strongly basic or weakly basic anion exchanger and operated in cocurrent flow.

In a preferred embodiment of the present method, the multichamber lift bed is operated together with 1 to 5, particularly 2 to 3, cocurrent flow filters.

In a further preferred embodiment, the inventive method is operated using a trickling degasser which is connected between the multichamber lift bed and the cocurrent flow filter(s).

In a further preferred embodiment, a mixed-bed filter is connected downstream of the cocurrent flow filter(s).

The inventive method is termed below combination lift bed method.

The inventive combination lift bed method is a technology suitable for any type of ion exchange and adsorption using regeneration of the multichamber lift bed filter in countercurrent flow (upward flow charge, downflow regeneration) on the cation stage and also the integration of cocurrent flow filters on the anion stage which are regenerated as composite.

The downflow regeneration practiced in the lift bed filter combines the principal advantages of countercurrent flow regeneration with the particular merits of the highest exchange rate in the fine purification zone, the technologically solely correct displacement of the regeneration chemicals downward and automatic equalization of the liquid stream over the column cross section. Overall, operating the cation filter according to the lift bed method, regardless of the respective current operating phase, is especially insensitive to intermittent operation or load variations. A further advantage is that the resin mass can be, as required, backwashed in the filter itself. No additional external backwash container is required! To protect the nozzle slots from impurities, the respective filter chamber of the lift bed filter, depending on filter diameter, is equipped with an inert mass of approximately 100-200 mm layer height of preferably Lewatit® IN 42.

The combination lift bed method using monodisperse ion exchangers is distinguished by extremely high utilization of the regeneration chemicals with simultaneously high useable capacity. In addition, low inherent water requirement and the resultant reduction of the amounts of waste water ensure very high economic efficiency together with high ecological contribution.

Further characteristics such as very high flexibility toward load variations and/or relatively high input rates of suspended impurities are characteristic features of the combination lift bed method.

For the inventive combination lift bed method, use is made of monodisperse ion exchangers. As an index of the monodispersity of the ion exchangers, the ratio of the 90% value ($\varnothing(90)$) and the 10% value ($\varnothing(10)$) of the volume distribution is used. The 90% value ($\varnothing(90)$) gives the diameter which is undershot by 90% of the particles. Correspondingly, 10% of the particles undershoot the diameter of the 10% value ($\varnothing(10)$). Monodisperse particle size distributions within the meaning of the present application mean $\varnothing(90)/\varnothing(10) \leq 1.4$, preferably $\varnothing(90)/\varnothing(10) \leq 1.25$, particularly preferably $\varnothing(90)/\varnothing(10) \leq 1.15$.

The production of monodisperse macroporous ion exchangers is known in principle to those skilled in the art. In addition to the fractionation of heterodisperse ion exchangers by sieving, essentially two direct production methods are differentiated, that is spraying or jetting and the seed-feed method in the production of the precursors, the monodisperse bead polymers. In the case of the seed-feed method, a monodisperse feed is used which itself can be produced, for example, by sieving or by jetting.

The monodisperse bead polymer, the precursor of the ion exchanger, can be produced, for example, by reacting monodisperse, if appropriate encapsulated, monomer droplets comprising a monovinyl aromatic compound, a polyvinyl aromatic compound, and also an initiator or initiator mixture, and if appropriate, a porogen, in aqueous suspension. To obtain macroporous bead polymers for the production of macroporous ion exchangers, the presence of porogen is absolutely essential. Before the polymerization, the if appropriate encapsulated monomer droplet is doped with a (meth) acrylic compound and subsequently polymerized. In a preferred embodiment of the present invention, therefore, for the synthesis of the monodisperse bead polymer, use is made of microencapsulated monomer droplets. The various production methods of monodisperse bead polymers, not only by the jetting principle but also by the seed-feed principle, are known to those skilled in the art from the prior art. At this point, reference may be made to U.S. Pat. No. 4,444,961, EP-A 0 046 535 (=U.S. Pat. No. 4,427,794), U.S. Pat. No. 4,419,245 and WO 93/12167 (=U.S. Pat. No. 5,231,115).

The functionalization which is required for the combination lift bed method of the bead polymers obtainable by the prior art to give monodisperse cation exchangers is likewise substantially known to those skilled in the art from the prior art.

As cation exchangers for the combination lift bed method, use is made of monodisperse, strongly acidic cation exchangers based on sulfonated styrene-divinylbenzene bead polymers. The monodisperse strongly acidic cation exchangers can then have a gel-type or macroporous structure. The terms macroporous and gel-type are described in detail in the specialist literature, for example in Seidl, Malinsky, Dusek, Heitz, adv. Polymer Sci., vol. 5 pages 113 to 213 (1967).

Gel-type strongly acidic cation exchangers suitable for the inventive method generally have a total capacity (TC) of 1.6 to 2.5 mol/l, preferably 1.8 to 2.4 mol/l, particularly preferably 1.8 to 2.2 mol/l, measured in the H form.

For example, in the inventive combination lift bed method, in the lift bed, monodisperse strongly acidic cation exchangers produced according to EP-A 1 256 383 (=US 2002 01 95 392) are used.

In a particular embodiment of the present invention, in the lift bed monodisperse strongly acidic cation exchangers having differing total capacity (TC) are used, the total capacity of the monodisperse strongly acidic cation exchanger (measured in the H form) being higher in at least one chamber, for example preferably 1.8 to 2.5 mol/l, particularly preferably 1.9 to 2.4 mol/l, than that of the cation exchanger(s) in the remaining chamber(s) whose TC is in the range 1.6 to 2.5 mol/l, preferably 1.8 to 2.0 mol/l. The cation exchanger having the higher total capacity is preferably in the upper chamber. By this means, surprisingly, very low residue conductivities are achieved at very low chemical usage.

In an alternative embodiment, in the lift bed, in addition to a cation exchanger, use is made of monodisperse strongly basic anion exchangers which are derived from functionalized styrene-divinylbenzene bead polymers. The strongly basic anion exchangers can in turn be gel-type or macroporous, gel-type strongly basic anion exchangers being preferred. Suitable gel-type strongly basic anion exchangers generally have a total capacity (TC) of 1.2 to 1.5 mol/l, preferably 1.2 to 1.4 mol/l, measured in the chloride form. In addition to the strongly basic anion exchangers, use can also be made of weakly basic macroporous anion exchangers. These generally have a total capacity of 1.2 to 1.5 mol/l, preferably 1.3-1.4 mol/l, measured in the free base/chloride form.

In the context of the present invention it has been found that monodisperse strongly basic anion exchangers which are obtained by a seed-feed polymerization method with subsequent functionalization by chloromethylation and amination are particularly highly suitable. The preparation of such anion exchangers is described extensively, for example, in EP-A 1 000 660. The monodisperse anion exchangers described there are preferably used in the inventive combination lift bed method.

The present invention relates in a preferred embodiment to a combination lift bed method in countercurrent flow for treating liquids with adsorption media by loading the adsorption media in upward flow, the lower part of the adsorption medium mass being present as fluidized bed and the upper part as fixed bed, regenerating the loaded adsorption media in downward flow and backwashing in upward flow, which comprises subdividing the filter space in the lift bed into at least 2, preferably 2 or 3, chambers separated by liquid-permeable bases, connecting these chambers to one another via pipes which bridge the liquid-permeable bases, permit the transport of adsorption medium and are provided with a shutoff element, distributing the adsorption medium among the chambers and before and/or during the individual working phases setting defined filling levels in the individual chambers by transferring adsorption medium from one chamber via the pipes bridging the liquid-permeable bases to the other chamber by means of liquid to be treated, regeneration medium or backwash liquid.

The monodisperse adsorption medium is conveyed inside the filter into the individual chambers or taken off from them during the individual working phases via the pipes bridging the liquid-permeable bases in an amount such that during loading the chamber through which the liquid to be treated flowed last is 80 to 98% by volume filled, based on the adsorption medium situated in the chamber, and that on regeneration this chamber through which liquid flowed last is uniformly 80 to 100% by volume filled with adsorption medium, based on the adsorption medium volume situated in the chamber. This means on regeneration of the ion exchanger swelling on regeneration from the chamber through which liquid flowed last, a volume of adsorption medium corresponding to the volume increase of the ion exchanger is transferred into the chambers arranged upstream of this chamber. On backwashing, as much adsorption medium is transferred from the chamber to be backwashed to the adjacent chamber, such that the backwash space in the chamber being backwashed is 30 to 100% by volume, preferably 40 to 50% by volume, based on the volume of the adsorption medium situated in the chamber to be backwashed.

To transport the adsorption medium from one chamber to the other on loading the liquid to be treated, on regeneration of the regeneration medium and on backwashing, the backwash liquid is used.

The amount of adsorption medium to fill the adsorption filter is preferably of a dimension such that the volume of the adsorption medium is 55 to 85% by volume, preferably 60 to 80% by volume, of the filter volume.

Liquid-permeable bases in the context of the inventive filters are to be taken to mean plates provided with orifices (nozzles) which are known in ion-exchange filter technology, which are readily permeable to the liquid, but not the adsorption medium.

The lift bed itself is, in the inventive combination lift bed method, one which comprises an adsorption filter subdivided into at least 2, preferably 2 or 3, chambers separated by liquid-permeable bases, the chambers of which arranged one above the other are connected to one another via a pipe which bridges the liquid-permeable bases, permits the transport of adsorption medium and is provided with a shutoff element.

The ratio of the volumes of the chambers of the lift bed in the subdivision of the filter into 2 chambers is 0.5-1.5:1, preferably 1:1, and, in the subdivision into 3 chambers, 0.5-1.5:0.5-1.5:1, preferably 1:1:1.

The pipes bridging the liquid-permeable bases are preferably mounted in the upper quarter of the lower chamber and in the lower quarter of the upper chamber, preferably in the upper fifth of the lower chamber and in the lower fifth of the upper chamber.

To achieve uniform transport of the adsorption medium through the pipes bridging the liquid-permeable bases, it has proved advantageous when the free cross section area of the orifices of the liquid-permeable bases is 50 to 300 cm$^2$/m$^2$, preferably 100 to 200 cm$^2$/m$^2$ of base area.

The inventive method can be carried out, for example, in the following manner:

In the loading phase, the pipe leading to the chamber through which the liquid to be treated flowed last is opened. Through the line, adsorption medium corresponding to the shrinkage of the ion exchanger is continuously replenished from the chamber situated beneath and in this manner an optimum packing density is achieved. The filter run can be interrupted at any time without layering occurring together with the described disadvantages. Vice versa, in the regeneration phase with the regeneration medium flowing from top to bottom, an amount of resin corresponding to the swelling of the ion exchanger occurring on regeneration is transported from the chamber through which the liquid to be treated flowed last and the regeneration medium first into the chamber arranged upstream. This measure achieves the fact that the ion exchanger present in the chamber through which regeneration medium flowed first has sufficient space during the regeneration and in the extraction phase to occupy its largest volume. If backwash of the adsorption medium is to be performed in the individual chambers, using the backwash liquid, preferably water, as much ion exchanger is transported into the upstream or downstream chamber as is necessary to create a backwash space of sufficient size.

A traditional embodiment of a lift bed is already described in DE 2950875 A1. An inventive combination lift bed component, for example in the form of a larger device (train), is described by way of example in FIG. 1.

The present invention therefore also relates to a device termed train comprising, in addition to other apparatuses, a combination lift bed for carrying out the combination lift bed method. In a preferred embodiment, such a train comprises
a) a combination lift bed and
b) at least one cocurrent flow filter.

In a further preferred embodiment, such a train can comprise a plurality, preferably 1 to 5, particularly preferably 2 to 3, in particular preferably two, cocurrent flow filters and, if appropriate, a CO$_2$ trickier (trickling degasser) and/or a mixed-bed filter.

In an inventive train, in the cocurrent flow filter(s), use is made of monodisperse weakly and strongly basic ion exchangers. These have a TC of 1.2 to 1.5, preferably 1.3 to 1.5. They are likewise obtainable by the abovementioned methods for production of monodisperse anion exchangers. The trickling degasser to be used in a preferred embodiment of a train acts to remove carbon dioxide from the liquid medium. For example, trickling degassers to be used according to the invention are described in Wabag, Handbuch Wasser [Water Handbook], 8th edition (Vulkan Verlag Essen, 1996 edition).

The mixed-bed filter to be used subsequently to the cocurrent flow filter(s) in an alternative preferred embodiment comprises at least two different monodisperse ion exchangers.

Preferably, in this case, use is made of monodisperse anion exchangers having a TC in the range from 1.2 to 1.6, particularly preferably from 1.4 to 1.5.

The combination lift bed method and thus also trains comprising such a combination lift bed method may be used for the demineralization of waters, preferably waters of natural or industrial or municipal origin.

In the method the waters to be demineralized are freed from cations, preferably from Na$^+$, NH$_4^+$, K$^+$, Fe$^{2+}$, Mg$^{2+}$, Ca$^{2+}$, Ba$^{2+}$, Sr$^{2+}$, Mn$^{2+}$, Li$^+$, Al$^{3+}$ and also from anions, preferably Cl$^-$, NO$_3^-$, SO$_4^{2-}$, HCO$_3^-$, Br$^-$, F$^-$ and also SiO$_2$ and CO$_2$.

Particularly preferably, by means of the inventive combination lift bed method, Na$^+$, NH$_4^+$, K$^+$, Fe$^{2+}$, Mg$^{2+}$, Ca$^{2+}$, Mn$^{2+}$ Cl$^-$, NO$_3^-$, SO$_4^{2-}$, HCO$^{3-}$ ions, and also SiO$_2$ and CO$_2$ are removed from the waters to be treated.

It will be understood that the specification and examples are illustrative but not limitative of the present invention and that other embodiments within the spirit and scope of the invention will suggest themselves to those skilled in the art.

EXAMPLES

Performance Comparison between a Train According to FIG. 1 with Combination Lift Bed and without Combination Lift Bed FIG. 1 shows a combination lift bed filled with Lewatit® Mono Plus S 200 KR and Lewatit® Mono Plus S 100 in combination with a trickling degasser, two cocurrent flow filters one comprising Lewatit® Mono Plus MP 64, the other Lewatit® Mono Plus M 500, and also a mixed-bed filter comprising Lewatit® Mono Plus M 800 and Lewatit® Mono Plus S 100 H.

The respective ion exchangers in the train according to FIG. 1 have the following properties:

|   |   | Lift bed |   |   |
|---|---|---|---|---|
| A | Lewatit ® | MonoPlus S 200 KR | monodisperse cation exchanger | TC = 2.1 equivalent/l (H form) |
| B | Lewatit ® | MonoPlus S 100 | monodisperse cation exchanger | TC = 2.0 equivalent/l (Na form) |
|   |   | Trickling degasser |   | Slip <0.2 m equivalent/l CO$_2$ |
| C | Lewatit ® | Cocurrent flow filter 1 MonoPlus MP64 | monodisperse anion exchanger | TC = 1.3 equivalent/l (free base/Cl$^-$ form) |
| D | Lewatit ® | Cocurrent flow filter 2 MonoPlus M500 | monodisperse anion exchanger | TC = 1.2 equivalent/l (Cl form) |
| E | Lewatit ® | Mixed-bed filter MonoPlus M 800 | monodisperse anion exchanger | TC = 1.5 equivalent/l (Cl form) |
| F | Lewatit ® | MonoPlus S 100 H | monodisperse cation exchanger | TC = 1.8 equivalent/l (H form) |

The entire filter of the lift bed comprises the two chambers which are separated from one another by a nozzle plate permeable to the liquid. Two further nozzle plates close off the lower chamber at the bottom and the upper chamber at the top for the ion exchanger. The ends of the filter unit form at the lower end a dished head with a valve and at the upper end a dished head with a valve.

The two chambers are filled with monodisperse ion exchangers Lewatit® MonoPlus S 200 KR and Lewatit® MonoPlus S 100. During operation, different sizes of backwash spaces remain above the ion exchanger fillings. The two chambers are connected to one another via a pipe and a valve. The pipe is in addition equipped with a valve for the exit of flushing water from the lower chamber. Pipe and valve make possible the exit of flushing water from the upper chamber.

For charging, the liquid to be treated is introduced via the open valve into the lower chamber in part filled with monodisperse ion exchanger Lewatit® MonoPlus S 100. From there the liquid flows through the nozzle plate and the open connection line serving for transport of the ion exchanger and the open valve into the upper chamber in order to leave the filter again in the treated state via the upper nozzle plate and a further valve. Continuously as much of the ion exchanger situated in the lower chamber is transported into the upper chamber as corresponds to the decrease in volume of the ion exchanger Lewatit® MonoPlus S 200 KR in the upper chamber progressively shrinking during the loading. This achieves the fact that the upper chamber is always substantially filled with ion exchanger and prevents, in the event of batchwise operation or operating interruptions, unwanted layering of the ion exchanger occurring in the upper chamber. In the case of continuous operation, when the upper chamber is already at least 95% by volume filled with ion exchanger at the start of the filter run, a valve in the connection line can remain closed, since any possible layering can only be slight and, in the case of continuous procedure, operating interruptions only come into consideration before complete regeneration and in this regeneration, the consequences of a layering which possibly occurs can always be compensated for.

In the regeneration following loading, using the regeneration medium stream conducted from top to bottom, as much of the ion exchanger filling Lewatit® MonoPlus S 200 KR is recirculated from the upper chamber to an upstream chamber as corresponds to the increase in volume of the ion exchanger filling during regeneration, so that the ion exchanger situated in the upper chamber has sufficient space in the regeneration and extraction phase to occupy its greatest volume.

If the filling of the lower chamber through which medium to be treated flowed first is to be backwashed, first as much ion exchanger as possible is transported into the subsequent upper chamber during operation via the transport line and an open valve. For this the transport water is allowed to enter at one valve and exit at another valve. Then all valves are closed. If the ion exchanger to be backwashed from the lower chamber has sunk far enough into the range, the backwash operation can begin.

The backwash is performed in principle as already described in DE 2 950 875 A1 (=U.S. Pat. No. 4,461,706), the contents of which are hereby incorporated in the present application.

|  | without combination lift bed | with combination lift bed |
|---|---|---|
| Sulfuric acid (100%) g/l | 117 | 80 |
| Sodium hydroxide solution (100%) g/l | 128 | 97 |
| Conductivity (µS/cm) | 10-15 | <1 |

|  | without combination lift bed | with combination lift bed |
|---|---|---|
| System flowrate (m³/h) | 57 | 68 |
| Productivity liter/year | 1.194 billions | 1.194 billions |
| Regeneration time (h) | 4 | 3 |

The data show that using monodisperse ion exchangers a significant reduction of conductivity of the medium to be treated to a value less than 1 µS/cm for the same annual flowrate compared with the use of heterodisperse ion exchangers is achieved.

In addition, the regeneration time is shortened by 1 hour and also the consumption of regeneration media is significantly lower than in the case of heterodisperse ion exchangers.

Finally, the use of monodisperse ion exchangers in the combination lift bed method leads to a 20% higher system flowrate compared with the use of heterodisperse ion exchangers. The present invention has been described with reference to specific details and examples of particular embodiments thereof. It is not intended that such details and examples be regarded as limitations upon the scope of the invention except insofar as and to the extent that they are included in the accompanying claims.

What is claimed is:

1. A method for the demineralization of water using ion-exchanger filters, which comprises using a combination of a cation filter comprising monodisperse strongly acidic cation exchanger and operated as a multichamber lift bed and also at least one anion filter comprising monodisperse strongly basic anion exchanger and operated in cocurrent flow.

2. The method as claimed in claim 1, wherein the monodisperse ion exchangers were produced by the seed-feed process or by jetting.

3. The method as claimed in claim 1 or 2, wherein the strongly acidic cation exchanger has a total capacity of 1.8 mol/l to 2.5 mol/l.

4. The method as claimed in one of claims 1 or 2, wherein use is made of monodisperse strongly basic anion exchangers having a total capacity of 1.2 to 1.5 mol/liter.

5. The method as claimed in claim 2, wherein the anion exchanger was obtained by the seed-feed process with subsequent functionalization by chloromethylation and amination.

6. A device for the demineralization of water comprising
a) a multi-chamber lift bed, wherein said multi-chamber lift bed comprises monodisperse strongly acidic cation exchanger; and
b) a cocurrent flow filter, wherein said cocurrent flow filter comprises at least one anion filter, said anion filter comprises a monodisperse strongly basic anion exchanger.

7. The device according to claim 6, further comprising:
c) a trickling degasser, said trickling degasser being positioned between the multi-chamber lift bed and the cocurrent flow filter.

8. The device according to claim 6, further comprising:
d) a mixed-bed filter, said mixed-bed filter being connected downstream of the cocurrent flow filter.

* * * * *